US010982566B2

(12) United States Patent
Fujimura et al.

(10) Patent No.: US 10,982,566 B2
(45) Date of Patent: Apr. 20, 2021

(54) TURBINE AND GAS TURBINE

(71) Applicant: MITSUBISHI HEAVY INDUSTRIES, LTD., Tokyo (JP)

(72) Inventors: Daigo Fujimura, Tokyo (JP); Takashi Hiyama, Tokyo (JP); Hiroshi Watanabe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 111 days.

(21) Appl. No.: 16/486,720

(22) PCT Filed: Feb. 28, 2018

(86) PCT No.: PCT/JP2018/007511
§ 371 (c)(1),
(2) Date: Aug. 16, 2019

(87) PCT Pub. No.: WO2018/159681
PCT Pub. Date: Sep. 7, 2018

(65) Prior Publication Data
US 2019/0383173 A1    Dec. 19, 2019

(30) Foreign Application Priority Data
Feb. 28, 2017  (JP) .............................. JP2017-037690

(51) Int. Cl.
*F01D 25/30*    (2006.01)
*F23R 3/46*    (2006.01)

(52) U.S. Cl.
CPC .......... *F01D 25/30* (2013.01); *F05D 2220/32* (2013.01); *F05D 2240/12* (2013.01); *F05D 2260/60* (2013.01); *F23R 3/46* (2013.01)

(58) Field of Classification Search
CPC .......... F01D 25/30; F01D 5/145; F01D 5/143; F05D 2240/12; F05D 2260/60;
(Continued)

(56) References Cited

U.S. PATENT DOCUMENTS 3,552,877 A * 1/1971 Christ ..................... F01D 25/30
 415/211.2
5,588,799 A * 12/1996 Kreitmeier ............. F01D 25/30
 415/207
(Continued)

FOREIGN PATENT DOCUMENTS

JP    7-42863    8/1995
JP    3999803    10/2007
(Continued)

OTHER PUBLICATIONS

International Search Report dated May 22, 2018 in International (PCT) Patent Application No. PCT/JP2018/007511, with English Translation.
(Continued)

*Primary Examiner* — Eldon T Brockman
(74) *Attorney, Agent, or Firm* — Wenderoth, Lind & Ponack, L.L.P.

(57) ABSTRACT

A turbine is equipped with a turbine rotor (21), a turbine casing, a turbine blade (24), a turbine stator and a diffuser (4A). The diffuser (4A) is equipped with an inner cylinder (41) extending along an axis, an outer cylinder covering the inner cylinder (41) from an outer circumferential side and forming an exhaust flow path (C) between the inner cylinder (41) and the outer cylinder. The inner cylinder (41) is equipped with an inclined surface (51) extending from an inner side to an outer side in the radial direction centering on the axis as going from one side to the other side in the direction of the axis. The inclined surface (51) is disposed to intersect an extension (55) obtained by extending platforms (54) of a plurality of turbine blades (24) to the other side in the direction of the axis, in a cross sectional view including the axis.

23 Claims, 6 Drawing Sheets

(58) Field of Classification Search
CPC ........... F05D 2220/31; F05D 2250/324; F05D 2270/17; F05D 2210/42; F05D 2240/14; F23R 3/46
See application file for complete search history.

(56) References Cited

U.S. PATENT DOCUMENTS

| | | | | |
|---|---|---|---|---|
| 5,707,208 | A * | 1/1998 | Kreitmeier | ............. F01D 25/30 |
| | | | | 415/207 |
| 6,533,546 | B2 * | 3/2003 | Kreitmeier | ................ F01D 9/02 |
| | | | | 415/211.2 |
| 8,157,509 | B2 * | 4/2012 | Black | ...................... F01D 25/30 |
| | | | | 415/138 |
| 8,475,125 | B2 * | 7/2013 | Neeli | ...................... F01D 5/225 |
| | | | | 415/211.2 |
| 9,587,519 | B2 * | 3/2017 | Salunkhe | ................. F02K 1/04 |
| 10,753,217 | B2 * | 8/2020 | Nishimura | .............. F01D 9/041 |
| 2009/0053046 | A1 * | 2/2009 | Black | ...................... F01D 25/30 |
| | | | | 415/173.1 |
| 2015/0143816 | A1 * | 5/2015 | Salunkhe | .............. F01D 25/162 |
| | | | | 60/796 |
| 2016/0017734 | A1 * | 1/2016 | Nishimura | ............ F01D 25/162 |
| | | | | 415/208.2 |

FOREIGN PATENT DOCUMENTS

| | | |
|---|---|---|
| JP | 2009-52552 | 3/2009 |
| JP | 2011-236771 | 11/2011 |
| JP | 2013-170486 | 9/2013 |
| JP | 2018-141450 | 9/2018 |

OTHER PUBLICATIONS

Written Opinion of the International Searching Authority dated May 22, 2018 in International (PCT) Patent Application No. PCT/JP2018/007511, with English Translation.

* cited by examiner

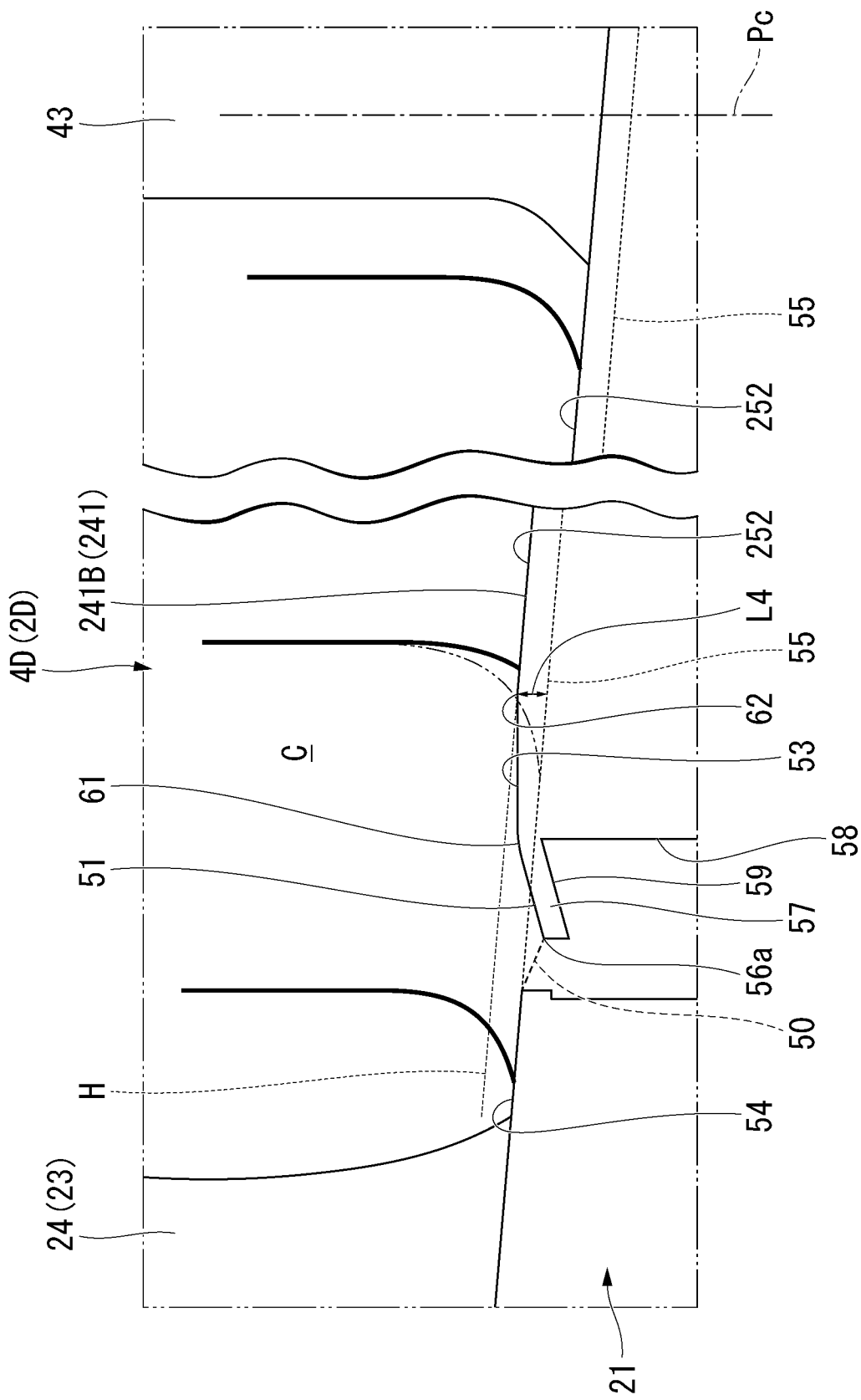

TURBINE AND GAS TURBINE

TECHNICAL FIELD

The present invention relates to a turbine and a gas turbine.

Priority is claimed on Japanese Patent Application No. 2017-37690, filed Feb. 28, 2017, the content of which is incorporated herein by reference.

BACKGROUND ART

In general, a gas turbine includes a compressor, a combustor, and a turbine. The compressor compresses external air to generate high-pressure air. The combustor mixes and combusts the high-pressure air generated by the compressor and fuel to generate high-temperature and high-pressure combustion gas. The turbine is driven by the combustion gas generated by the combustor.

A diffuser having an inner cylinder, an outer cylinder and a strut is provided on a downstream side of the turbine (see, for example, Patent Document 1). The inner cylinder is disposed on an inner circumferential side of the diffuser. The outer cylinder covers the inner cylinder from an outer circumferential side to form an exhaust flow path between the outer cylinder and the inner cylinder. A plurality of struts are provided at intervals in a circumferential direction. The struts extend in a radial direction of the turbine from an outer circumferential surface of the inner cylinder. The inner cylinder and the outer cylinder are connected to each other via the struts.

The exhaust flow path of the diffuser is formed such that a flow path area gradually increases from the upstream side to the downstream side of a flowing direction of the combustion gas. The combustion gas (exhaust gas) that drives the turbine is restored to a static pressure by passing through the exhaust flow path thus formed.

The improved performance of the diffuser substantially increases a pressure ratio of the gas turbine. Therefore, the efficiency of the entire gas turbine can be improved by improvement in the performance of the diffuser.

CITATION LIST

Patent Document

[Patent Document 1]
Japanese Patent No. 3999803

SUMMARY OF INVENTION

Technical Problem

In the diffuser, a boundary layer is formed on the outer circumferential surface of the inner cylinder that forms the exhaust flow path. Since the diffuser flow is a reverse pressure gradient, a momentum of the flow is easily lowered. Therefore, if a separation region due to a local momentum loss occurs, there is a possibility that the separation progresses toward the downstream side of the flow and is enlarged.

The present invention provides a turbine and a gas turbine capable of improving the exhaust performance of the diffuser to obtain an improvement in efficiency of the entire gas turbine.

Solution to Problem

According to a first aspect of the present invention, a turbine includes a turbine rotor, a turbine casing, a plurality of turbine blades, a plurality of turbine vanes, and a diffuser. The turbine rotor extends along an axis and is rotatable about the axis. The turbine casing covers the turbine rotor from an outer circumferential side. The plurality of turbine blades are arranged in a circumferential direction of the axis on an outer circumferential surface of the turbine rotor. The plurality of turbine vanes are provided to be adjacent to one side in the direction of the axis with respect to the turbine blade on an inner circumferential surface of the turbine casing, and are arranged in the circumferential direction. The diffuser is provided on the other side in the direction of the axis of the turbine blade, and forms an exhaust flow path through which exhaust gas flows from one side to the other side in the direction of the axis. The diffuser is equipped with an inner cylinder extending along the axis, and an outer cylinder that covers the inner cylinder from an outer circumferential side and forms the exhaust flow path between the inner cylinder and the outer cylinder. The inner cylinder is equipped with a first inclined surface which extends to an outer side from the inner side in the radial direction centering on the axis, from one side to the other side in the direction of the axis. The first inclined surface is disposed to intersect an extension line obtained by extending platforms of the plurality of turbine blades to the other side in the direction of the axis in a cross-sectional view including the axis.

In some cases, a boundary layer formed along the outer circumferential surface of the inner cylinder of the diffuser may develop gradually from a position of the turbine blade disposed to be closest to the lowest downstream side in the direction of the axis toward the downstream side of the diffuser along the platform and the outer circumferential surface of the inner cylinder. However, because the first inclined surface is formed on the extension line of the platform, the boundary layer flow collides with the first inclined surface. Therefore, it is possible to suppress the development of the boundary layer and to suppress the separation of the flow from the outer circumferential surface of the inner cylinder. Therefore, the exhaust performance of the diffuser is capable of being improved to obtain an improvement in efficiency of the entire gas turbine.

According to a second aspect of the present invention, the inner cylinder according to the first aspect may be provided with the first inclined surface where is closest to one side in the direction of the axis.

With such a configuration, it is possible to suppress the development of the boundary layer by increasing the velocity of the boundary layer flow along the inner cylinder at the inlet of the diffuser. Therefore, it is possible to suppress the development of the boundary layer along the inner cylinder in the entire region of the diffuser.

According to a third aspect of the present invention, in the turbine according to the first or second aspect, a seal gas inflow port for causing a seal gas to flow into the exhaust flow path may be provided between the inner cylinder and the platform.

With such a configuration, even if the seal gas flows into the inlet of the diffuser, it is possible to suppress a decrease in the velocity of the boundary layer flow in the vicinity of the outer circumferential surface of the inner cylinder, by the first inclined surface. Therefore, even under the condition that the boundary layer easily develops by the inflow of the seal gas, it is possible to suppress the boundary layer from developing along the inner cylinder and the flow of the boundary layer from being separated.

According to a fourth aspect of the present invention, in the inner cylinder according to any one of the first to third aspects, an outer circumferential surface closer to the other side in the direction of the axis than the first inclined surface may be disposed on a more outer side in the radial direction than the extension line.

Since the outer circumferential surface of the inner cylinder is disposed on a more outer side in the radial direction than the extension line, the total pressure on the inner cylinder side increases as compared to the case where the outer circumferential surface of the inner cylinder is disposed on the extension line, thereby the thickness of the boundary layer is capable of being reduced. Therefore, separation of flow of the boundary layer is capable of being further reduced.

According to a fifth aspect of the present invention, in the turbine according to any one of the first to fourth aspects, a first distance, which is a distance at the same position in the direction of the axis between the extension line and a first apex portion of the first inclined surface located to be closest to the outer side in the radial direction, may be set to be equal to or less than 10% with respect to the blade height of the turbine blade.

With such a configuration, it is possible to suppress development of a boundary layer by the first inclined surface, and to suppress separation of the flow from the outer circumferential surface of the inner cylinder.

Also, for example, when the first distance exceeds 10% of the blade height, an amount of offset between the extension line of the platform and the first apex portion becomes excessive, and there is a possibility that the flowing direction along the outer circumferential surface of the inner cylinder is directed to the outer side in the radial direction too much to cause a separation or the like. However, by setting the first distance to be equal to or less than 10% of the blade height, it is possible to suppress the thickness of the boundary layer formed along the outer circumferential surface of the inner cylinder of the diffuser, while suppressing the separation due to the flowing direction described above.

According to a sixth aspect of the present invention, the first distance according to the fifth aspect may be set to be equal to or less than 5% with respect to the blade height.

With such a configuration, the separation caused by the flowing direction is capable of being further suppressed.

According to a seventh aspect of the present invention, the first distance according to the fifth aspect may be set to be equal to or less than 3% with respect to the blade height.

With such a configuration, the separation caused by the flowing direction is capable of being further suppressed.

According to an eighth aspect of the present invention, the first distance according to any one of the fifth to seventh aspects may be greater than 0%.

With such a configuration, the total pressure of the main flow of the exhaust gas increases by an amount by which the first apex portion is disposed radially outward from the extension line, thereby it is possible to suppress the thickness of the boundary layer formed along the outer circumferential surface of the inner cylinder of the diffuser.

According to a ninth aspect of the present invention, the first apex portion according to any one of the fifth to eighth aspects may be disposed on a more outer side in the radial direction than an edge portion on the other side of the platform in the direction of the axis.

With such a configuration, it is possible to reduce the thickness of the boundary layer at the position of the first apex portion of the diffuser than the thickness of the boundary layer at the turbine blade outlet. Therefore, it is possible to suppress the boundary layer from developing toward the downstream side of the diffuser.

According to a tenth aspect of the present invention, the inner cylinder according to any one of the fifth to ninth aspects may be provided with a second inclined surface. The second inclined surface is disposed to be closer to the other side in the direction of the axis than the first inclined surface, is disposed on a more outer side in the radial direction than the extension line, and extends from the outer side to the inner side in the radial direction as going from one side to the other in the direction of the axis. A second distance, which is a distance at the same position in the direction of the axis between the extension line and a second apex portion of the second inclined surface disposed to be closest to the outer side in the radial direction, may be set to be equal to or less than 10% with respect to the blade height of the turbine blade.

With such a configuration, the flow path cross-sectional area of the diffuser is capable of being expanded radially inward by the second inclined surface. Furthermore, since the second apex portion is set to be equal to or less than 10% with respect to the blade height of the turbine blade, it is possible to suppress separation of the flow due to the inclination of the second inclined when the flow exceeds the second apex portion.

According to an eleventh aspect of the present invention, the second distance according to the tenth aspect may be set to be equal to or less than 5% with respect to the blade height.

With such a configuration, it is possible to further suppress separation.

According to a twelfth aspect of the present invention, the second distance according to the tenth aspect may be set to be equal to or less than 3% with respect to the blade height.

With such a configuration, it is possible to further suppress separation.

According to a thirteenth aspect of the present invention, the second distance according to any one of the tenth to twelfth aspects may be set to be greater than 0% with respect to the blade height.

With such a configuration, the total pressure of the main flow of the exhaust gas increases by the amount by which the second apex portion is disposed radially outward from the extension line, thereby it is possible to suppress the thickness of the boundary layer formed along the outer circumferential surface of the inner cylinder of the diffuser.

According to a fourteenth aspect of the present invention, the turbine according to any one of the tenth to thirteenth aspects may further include a connection surface connecting the first apex portion and the second apex portion, and the second distance may be longer than the first distance.

With such a configuration, it is possible to reduce a difference in angle between the first inclined surface and the connection surface and a difference in angle between the connection surface and the second inclined surface. As a result, it is possible to suppress separation of the flow between the first inclined surface and the connection surface and between the connection surface and the second inclined surface.

According to a fifteenth aspect of the present invention, the diffuser according to any one of the fifth to fourteenth aspects may include a strut connecting the inner cylinder and the outer cylinder. The inner cylinder may include a change point at which an inclination angle with respect to the axis changes within a range in which the strut is disposed in the direction of the axis. A third distance, which is a distance between the extension line and an outer circumferential surface of the inner cylinder disposed on a more outer side in the radial direction than the extension line in the range from an inlet of the inner cylinder to the change point in the direction of the axis at the same position in the direction of the axis, may be set to be equal to or less than 10% with respect to a blade height of a blade of the turbine.

On the downstream side of the strut, the flow path cross-sectional area is expanded and the boundary layer easily develops. In contrast, by setting the third distance to be equal to or less than 10% with respect to the blade height of blade of the turbine, development of the boundary layer can also be suppressed, while suppressing the occurrence of separation of flow at the position of the strut from the blade. Therefore, it is possible to improve the performance of the diffuser.

According to a sixteenth aspect of the present invention, the third distance according to the fifteenth aspect may be set to be equal to or less than 5% with respect to the blade height.

With such a configuration, it is possible to further suppress the occurrence of separation on the upstream side of the strut.

According to a seventeenth aspect of the present invention, the third distance according to the fifteenth aspect may be set to be equal to or less than 3% with respect to the blade height.

With such a configuration, it is possible to further suppress the occurrence of separation at the upstream side of the strut.

According to an eighteenth aspect of the present invention, the third distance according to any one of the fifteenth to seventeenth aspects may be set to be greater than 0%.

With such a configuration, the total pressure of the main flow of the exhaust gas increases by the amount by which the outer circumferential surface of the inner cylinder is disposed on a more outer side in the radial direction than the extension line, thereby it is possible to suppress the thickness of the boundary layer formed along the outer circumferential surface of the inner cylinder of the diffuser.

According to a nineteenth aspect of the present invention, the diffuser according to any one of the fifth to fourteenth aspects may include a strut connecting the inner cylinder and the outer cylinder, a change point at which an inclination angle with respect to the axis changes may not be formed in the inner cylinder within the range in which the strut is disposed in the direction of the axis, and a fourth distance, which is a distance between the extension line and an outer circumferential surface of the inner cylinder, in the range from the inlet of the inner cylinder in the direction of the axis to a central position of the strut at the same position in the direction of the axis, may be set to be equal to or less than 10% with respect to the blade height of the blade of the turbine.

On the downstream side of the strut, the flow path cross-sectional area is expanded and the boundary layer easily develops. In contrast, by setting the fourth distance to be equal to or less than 10% with respect to the blade height of the blade of the turbine, the development of the boundary layer can also be suppressed, while suppressing the occurrence of separation of the flow from the blade to the position of the strut. Therefore, the performance of the diffuser is capable of being improved.

According to a twentieth aspect of the present invention, the fourth distance according to the nineteenth aspect may be set to be equal to or less than 5% with respect to the blade height.

With such a configuration, it is possible to further suppress the occurrence of separation on the upstream side of the strut.

According to a twenty-first aspect of the present invention, the fourth distance according to the nineteenth aspect may be set to be equal to or less than 3% with respect to the blade height.

With such a configuration, it is possible to further suppress the occurrence of separation on the upstream side of the strut.

According to a twenty-second aspect of the present invention, the fourth distance according to any one of the nineteenth to twenty-first aspects may be set to be greater than 0%.

With such a configuration, the total pressure of the main flow of the exhaust gas increases by the amount by which the outer circumferential surface of the inner cylinder is disposed on a more outer side in the radial direction than the extension line, thereby it is possible to suppress the thickness of the boundary layer formed along the outer circumferential surface of the inner cylinder of the diffuser.

According to a twenty-third aspect of the present invention, a gas turbine includes a compressor generating compressed air obtained by compressing air; a combustor mixing fuel with the compressed air to generate a combustion gas; and the turbine according to any one of the first to twenty-second aspects driven by the combustion gas.

With such a configuration, since the pressure recovery in the diffuser of the turbine is capable of being efficiently performed, the performance is capable of being improved.

Advantageous Effects of Invention

According to the turbine and the gas turbine, the exhaust performance of the diffuser is capable of being improved to obtain the improvement in efficiency of the entire gas turbine.

BRIEF DESCRIPTION OF DRAWINGS

FIG. 6 is a view corresponding to FIG. 4 according to a fourth embodiment of the present invention.

DESCRIPTION OF EMBODIMENTS

First Embodiment

Next, a turbine and a gas turbine according to a first embodiment of the present invention will be described on the basis of the drawings.

Figure 1:
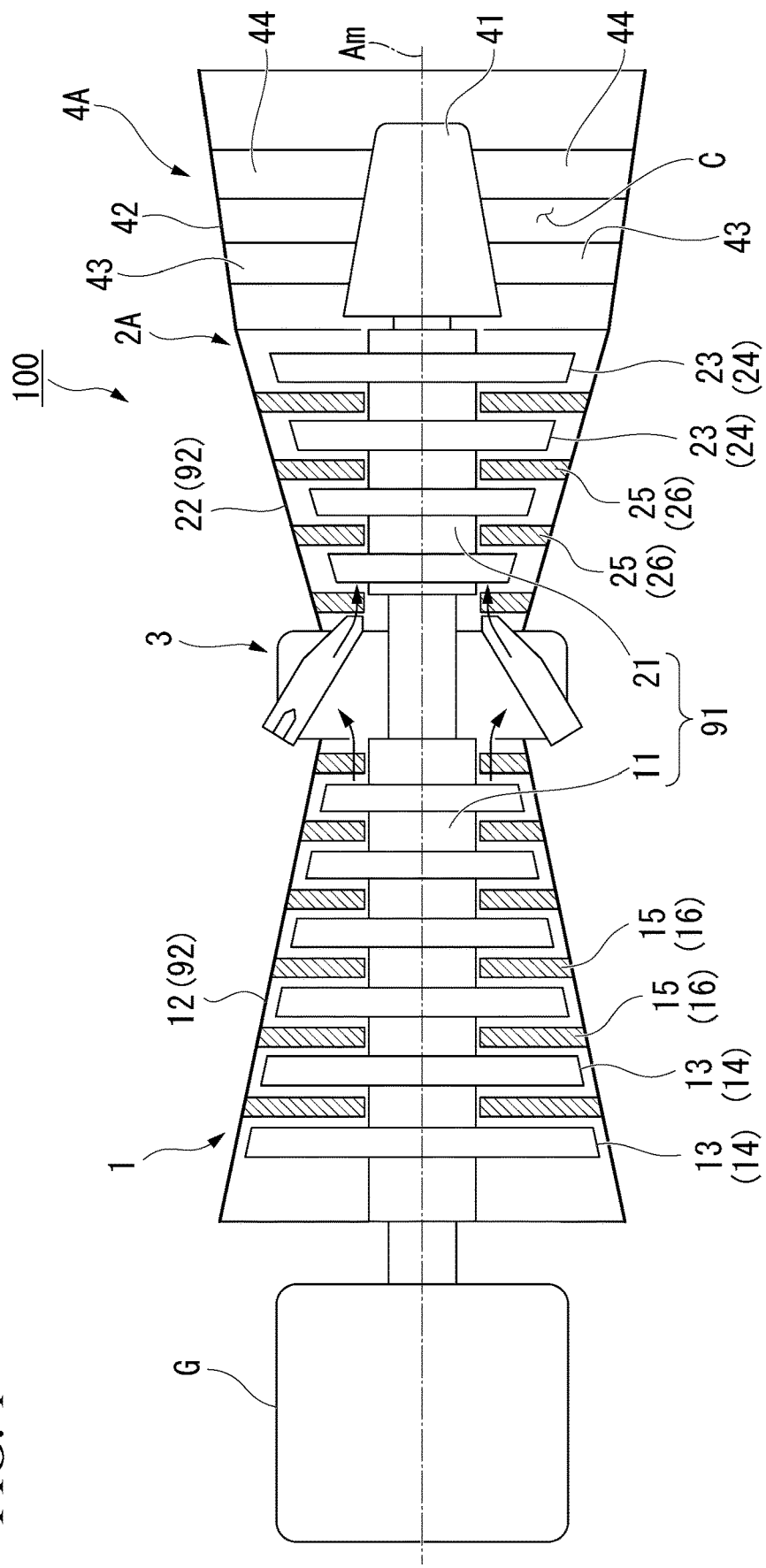
FIG. 1 is a configuration diagram illustrating a schematic configuration of a gas turbine of a first embodiment of the present invention.

As illustrated in FIG. 1, a gas turbine 100 according to the first embodiment includes a compressor 1, a combustor 3, and a turbine 2A.

The compressor 1 generates the high-pressure air. The compressor 1 includes a compressor rotor 11 and a compressor casing 12. The compressor casing 12 covers the compressor rotor 11 from an outer circumferential side. The compressor casing 12 extends along an axis Am.

A plurality of compressor blade stages 13 arranged at intervals in the direction of the axis Am are provided on an outer circumferential surface of the compressor rotor 11. Each of the compressor blade stages 13 includes a plurality of compression blades 14. The compressor blades 14 of each compressor blade stage 13 are arranged on the outer circumferential surface of the compressor rotor 11 at intervals in the circumferential direction of the axis Am.

A plurality of compressor vane stages 15 arranged at intervals in the direction of the axis Am are provided on an inner circumferential surface of the compressor casing 12. The compressor vane stages 15 are disposed alternately with the aforementioned compressor blade stages 13 in the direction of the axis Am. Each of the compressor vane stages 15 includes a plurality of compressor vanes 16. The compressor vanes 16 of each compressor vane stage 15 are arranged on the inner circumferential surface of the compressor casing 12 at intervals in the circumferential direction of the axis Am.

The combustor 3 mixes the high-pressure air generated by the compressor 1 with the fuel and combusts the mixture to generate a combustion gas. The combustor 3 is provided between the compressor casing 12 and the turbine casing 22 of the turbine 2A. The combustion gas generated by the combustor 3 is supplied to the turbine 2A.

The turbine 2A is driven by the combustion gas generated by the combustor 3. The turbine 2A has a turbine rotor 21, a turbine casing 22, and a diffuser 4A.

The turbine rotor 21 extends along the axis Am. A plurality of turbine blade stages 23 arranged at intervals in the direction of the axis Am are provided on the outer circumferential surface of the turbine rotor 21. Each of the turbine blade stages 23 includes a plurality of turbine blades 24. The turbine blades 24 of each of the turbine blade stages 23 are arranged on the outer circumferential surface of the turbine rotor 21 at intervals in the circumferential direction of the axis Am.

The turbine casing 22 covers the turbine rotor 21 from the outer circumferential side. A plurality of turbine vane stages 25 arranged at intervals in the direction of the axis Am are provided on the inner circumferential surface of the turbine casing 22. The turbine vane stages 25 are arranged alternately with the aforementioned turbine blade stages 23 in the direction of the axis Am. Each of the turbine vane stages 25 includes a plurality of turbine vanes 26. The turbine vanes 26 of each of the turbine vane stages 25 are arranged on the inner circumferential surface of the turbine casing 22 at intervals in the circumferential direction of the axis Am.

The compressor rotor 11 and the turbine rotor 21 are integrally connected to each other in the direction of the axis Am. A gas turbine rotor 91 is configured by the compressor rotor 11 and the turbine rotor 21. Similarly, the compressor casing 12 and the turbine casing 22 are integrally connected to each other along the axis Am. A gas turbine casing 92 is configured by the compressor casing 12 and the turbine casing 22.

The gas turbine rotor 91 is integrally rotatable about the axis Am inside the gas turbine casing 92.

When operating the gas turbine 100, first, the compressor rotor 11 (the gas turbine rotor 91) is rotationally driven by an external drive source. With the rotation of the compressor rotor 11, the external air is sequentially compressed to generate the high-pressure air. The high-pressure air is supplied into the combustor 3 through the compressor casing 12. Inside the combustor 3, fuel is mixed with the high-pressure air and combusted to generate high-temperature and high-pressure combustion gas. The combustion gas is supplied into the turbine 2A through the turbine casing 22. Inside the turbine 2A, a rotational driving force is imparted to the turbine rotor 21 (the gas turbine rotor 91) by sequentially colliding the combustion gas with the turbine blade stage 23 and the turbine vane stage 25. The rotational energy is used, for example, to drive a generator G or the like connected to a shaft end. The combustion gas driving the turbine 2A is discharged to the outer side after the pressure (static pressure) is increased when passing through the diffuser 4A as the exhaust gas.

Figure 2:
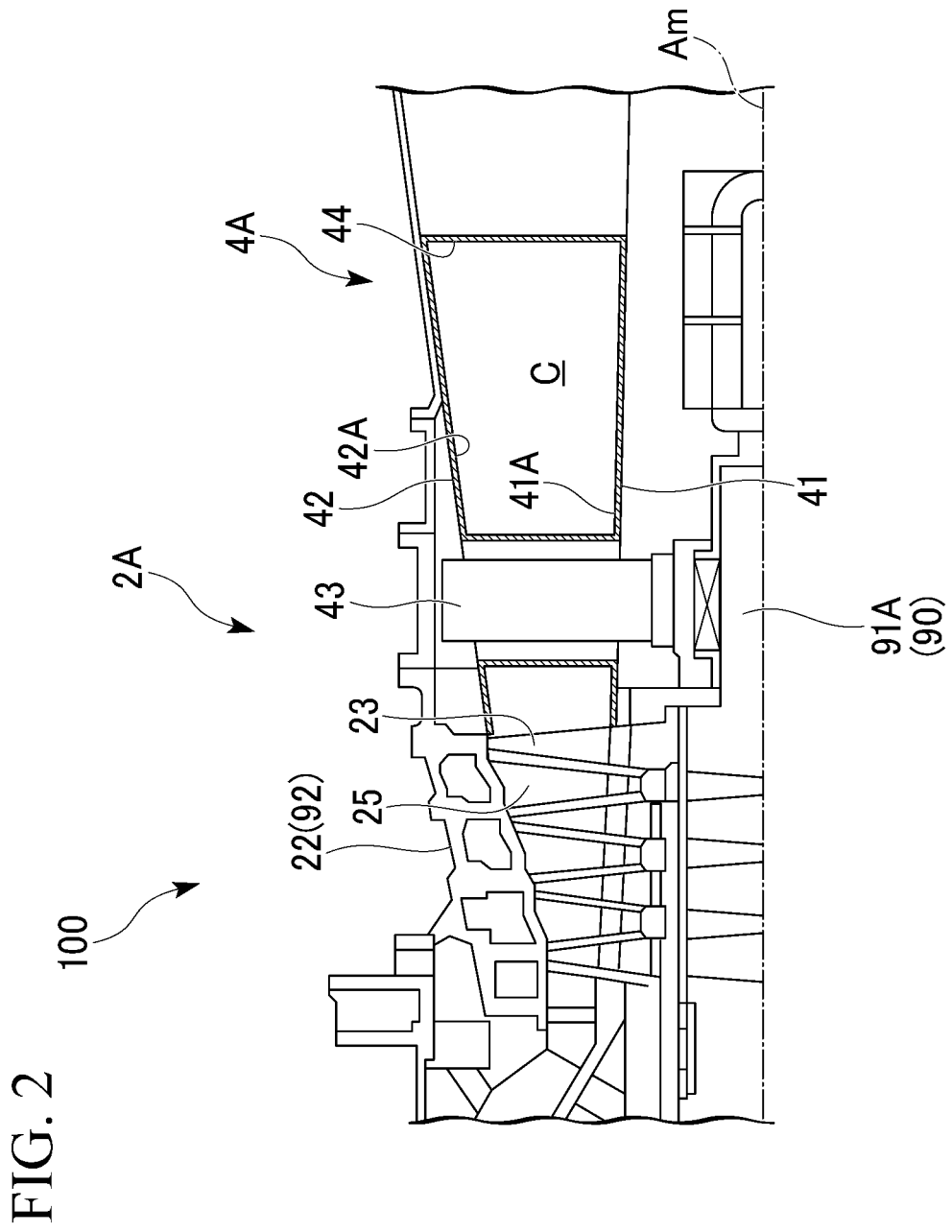
FIG. 2 is a cross-sectional view along an axis of a diffuser according to the first embodiment of the present invention.

As illustrated in FIGS. 1 and 2, the diffuser 4A is provided integrally with the turbine casing 22 (the gas turbine casing 92). The diffuser 4A includes an inner cylinder 41, an outer cylinder 42, and struts 43 and 44.

The inner cylinder 41 is formed in a cylindrical shape extending along the axis Am. A bearing device or the like that supports a shaft end portion 91A of the gas turbine rotor 91 in a rotatable manner is provided inside the inner cylinder 41.

The outer cylinder 42 is formed in a cylindrical shape that covers the inner cylinder 41 from the outer circumferential side. An exhaust flow path C through which the exhaust gas discharged from the turbine 2A flows is formed between the outer cylinder 42 and the inner cylinder 41. A cross-sectional area (a cross-sectional area orthogonal to the axis Am) of the exhaust flow path C formed between the outer cylinder 42 and the inner cylinder 41 is gradually enlarged from one side in the direction of the axis Am (a left side in the drawing of FIG. 2) toward the other side thereof (a right side of the drawing of FIG. 2). When the cross-sectional area of the exhaust flow path C is gradually enlarged in this way, kinetic energy of the exhaust gas flowing in the exhaust flow path C is gradually converted into pressure energy (a pressure recovery).

The struts 43 and 44 are disposed in the exhaust flow path C, and connect the inner cylinder 41 and the outer cylinder 42. The outer cylinder 42 is fixed and supported with respect to the inner cylinder 41 by the struts 43 and 44. The strut 43 is disposed to be adjacent to the turbine blade stage 23 of a last stage, which is located to be closest to the other side in the direction of the axis Am among the plurality of turbine blade stages 23, in the direction of the axis Am.

The strut 44 is provided at a position separated from the strut 43 to the other side in the direction of the axis Am. The struts 43 and 44 in this embodiment have shapes capable of reducing the shape resistance to the exhaust gas. As the shapes capable of reducing the shape resistance to the exhaust gas, for example, an oval shape having a long cross section in the flowing direction of the exhaust gas, and an airfoil in which the chord extends in the flowing direction of the exhaust gas are adopted.

Figure 3:
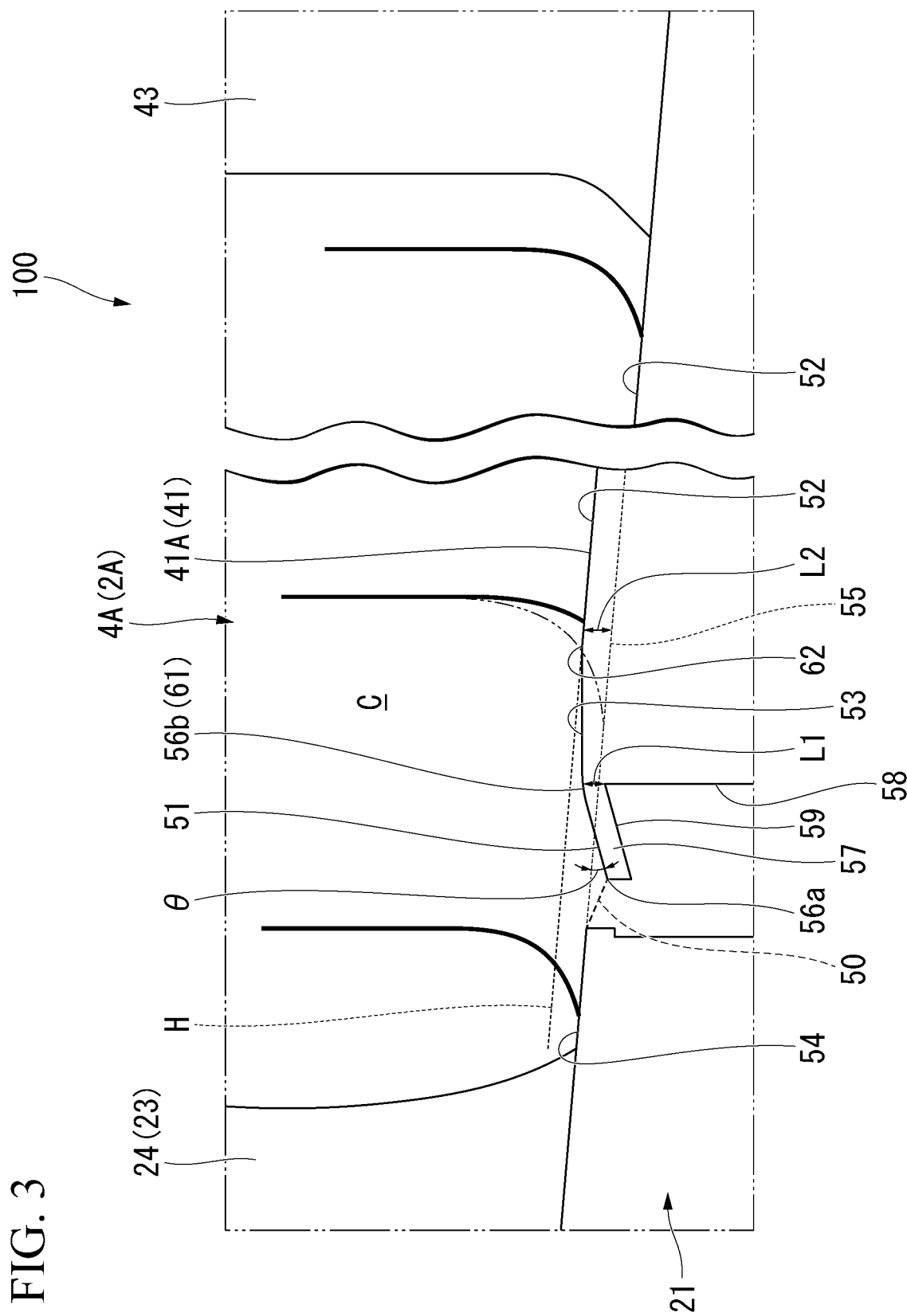
FIG. 3 is an enlarged schematic view of a diffuser inlet according to the first embodiment of the present invention.

As illustrated in FIG. 3, the gas turbine 100 is provided with a seal gas inflow port 50 at an inlet of the diffuser 4A. The seal gas inflow port 50 causes, for example, some of the compressed air generated by the compressor 1 or the like as a seal gas to flow toward the inside of the exhaust flow path C from a gap between the above-described inner cylinder 41 of the diffuser 4A and the turbine rotor 21.

An outer circumferential surface 41A of the inner cylinder 41 includes a first inclined surface (an inclined surface) 51, a second inclined surface 52, and a connection surface 53.

The first inclined surface 51 extends from the inner side toward the outer side in the radial direction centering on the axis Am as going from the turbine rotor 21 side which is one side in the direction of the axis Am to the outlet side of the diffuser 4A which is the other side. The first inclined surface 51 in the cross section illustrated in FIG. 3 illustrates a case of an inclined surface which approaches the axis Am at a constant inclination angle toward the turbine rotor 21 side. However, the first inclined surface 51 is not limited to a constant inclination angle. For example, in the cross section of FIG. 3, the first inclined surface 51 may have a convex curved surface shape or a concave curved surface shape from the inner side toward the outer side in the radial direction centering on the axis Am as going from one side to the other side in the direction of the axis Am. A radius of curvature of the convex curved surface shape or the concave curved surface shape is preferably set to be longer than, for example, the length of the first inclined surface 51 in the direction of the axis Am. Also, the first inclined surface 51 may be formed by combining the above-described convex curved surface and concave curved surface.

In the cross-sectional view including the axis Am illustrated in FIG. 2, the first inclined surface 51 is disposed to intersect an extension line 55 (indicated by a broken line in FIG. 3) obtained by extending the platform 54 of the turbine blade 24 of the turbine blade stage 23 disposed on the lowermost downstream side to the other side in the direction of the axis Am. In other words, a leading edge portion 56a on one side of the first inclined surface 51 in the direction of the axis Am is disposed on the inner inside in the radial direction centering on the axis Am than the extension line 55. A trailing edge portion 56b on the other side of the first inclined surface 51 in the direction of the axis Am is disposed on the outer side in the radial direction centering on the axis Am than the extension line 55. Among the angles formed between the first inclined surface 51 and the extension line 55 in the cross section including the axis Am in the first embodiment, an angle θ on the inner inside in the radial direction is an acute angle (for example, about 15 degrees). When the first inclined surface 51 is a curved surface, the angle θ formed between the tangent of the curved surface in the cross section and the extension line 55 becomes an acute angle.

The first inclined surface 51 is formed at closest to one side of the inner cylinder 41 in the direction of the axis Am. The first inclined surface 51 in the first embodiment is formed on a beam portion 57. The beam portion 57 extends like a cantilever from an inner wall 58 on the other side of the seal gas inflow port 50 in the direction of the axis Am toward the one side in the direction of the axis Am. A case where the beam portion 57 in the first embodiment has a lower surface 59 parallel to the first inclined surface 51 on the inner inside in the radial direction is illustrated. However, the lower surface 59 is not limited to the shape parallel to the first inclined surface 51.

The second inclined surface 52 is disposed at closer to the other side in the direction of the axis Am than the first inclined surface 51. The second inclined surface 52 is disposed on a more outer side in the radial direction than the extension line 55.

The second inclined surface 52 in the cross section illustrated in FIG. 3 shows an example case that an inclined surface which approaches the axis Am at a constant inclination angle toward the outlet of the diffuser 4A. However, as in the first inclined surface 51, the second inclined surface 52 is not limited to the case of a constant inclination angle. For example, same as in the first inclined surface 51, in the cross section of FIG. 3, the second inclined surface 52 may have a convex curved surface shape or a concave curved surface shape positioned from the outer side toward the inner side in the radial direction centering on the axis Am as going from the one side to the other side in the direction of the axis Am. The radius of curvature of the convex curved surface shape or the concave curved surface shape is capable of being set to be longer than, for example, the length of the second inclined surface 52 in the direction of the axis Am. Further, the second inclined surface 52 may be formed by combining the above-described convex curved surface and concave curved surface.

The connection surface 53 connects the first inclined surface 51 and the second inclined surface 52. More specifically, the connection surface 53 connects a first apex portion 61 disposed to be closest to the other side of the first inclined surface 51 in the direction of the axis Am, and a second apex portion 62 of the second inclined surface 52 disposed to be closest to one side in the direction of the axis Am. In the first embodiment, a case is illustrated in which the first inclined surface 51 and the connection surface 53 are connected in a curved surface shape and the connection surface 53 and the second inclined surface 52 are connected in a curved surface shape so as not to form an angle.

The first apex portion 61 is a part of the first inclined surface 51 that is farthest away from the extension line 55 to the outer side in the radial direction. Similarly, the second apex portion 62 is a part of the second inclined surface 52 that is farthest away from the extension line 55 to the outer side in the radial direction.

A first distance L1 and a second distance L2 may not be the same distance. In this embodiment, the first distance L1 between the first apex portion 61 and the extension line 55 at the same position in the direction of the axis Am is slightly shorter than the second distance L2 which is similarly a distance between the second apex portion 62 and the extension line 55. Thus, the connection surface 53 has a shape of a plane parallel to the axis Am or a shape similar to the plane parallel to the axis Am.

In FIG. 3, a thick solid line indicates a velocity distribution of the exhaust gas in the direction of the axis Am. In the velocity distribution, it is illustrated that, and the flow velocity is lowered in the vicinity of the platform 54 as the flow comes into contact with the platform 54. The radially outward increase of the decreasing range of the flow velocity means the development of the boundary layer.

As illustrated in FIG. 3, the main flow of the exhaust gas on the downstream side of the turbine blade stage 23 of the lowermost downstream side forms a boundary layer along the platform 54. In FIG. 3, the position of a broken line H illustrated on a more outer side in the radial direction than the platform 54 means a position of the radially outermost side of the boundary layer formed by the platform 54. A thickness of the boundary layer of the platform 54 illustrated here is an example and is not limited to this thickness. The boundary layer usually develops gradually downstream, and the flow velocity decreases, as in the velocity distribution of a two-dot chain line illustrated in the vicinity of the second apex portion 62 in FIG. 3.

In contrast, the turbine 2A of the embodiment mentioned above is disposed so that the first inclined surface 51 intersects the extension line 55. Therefore, the flow collides with the first inclined surface 51 to suppress the development of the boundary layer.

Since the outer circumferential surface 41A of the inner cylinder 41 on the other side in the direction of the axis Am is disposed on a more outer side in the radial direction than the inclined surface 51, the total pressure of the main flow increases.

Therefore, as shown by the thick line illustrated in the vicinity of the second apex portion 62, the flow closer to the downstream side (the other side in the direction of the axis Am) than the inclined surface 51 is formed so that the velocity of boundary layer flow along the outer circumferential surface 41A rises to scrape off the boundary layer of the platform 54 from the inner side to the outer side in the radial direction. Therefore, the thickness of the boundary layer is capable of being reduced at the inlet of the diffuser 4A. That is, when the boundary layer develops toward the strut 44, it is possible to suppress the flow from being separated from the outer circumferential surface 41A of the inner cylinder 41.

As a result, it is possible to improve the exhaust performance of the diffuser 4A to obtain an improvement in efficiency of the entire gas turbine 100.

Furthermore, the diffuser 4A includes the first inclined surface 51 where is closest to one side thereof in the direction of the axis Am. Therefore, it is possible to suppress the development of the boundary layer, by increasing the velocity of the boundary layer flow along the inner cylinder 41 at the inlet of the diffuser 4A. As a result, it is possible to suppress the development of the boundary layer along the inner cylinder over the entire region of the diffuser.

In addition, a seal gas inflow port 50 for causing the seal gas to flow into the exhaust flow path C is formed between the inner cylinder 41 and the platform 54. By forming the seal gas inflow port 50 in this way, the seal gas joins the main flow at the inlet of the diffuser 4A. When the seal gas joins the main flow in this way, in some cases, the flow velocity of the boundary layer is particularly lowered. However, even in this case, the first inclined surface 51 can suppress the decrease in the velocity of the boundary layer flow in the vicinity of the outer circumferential surface 41A of the inner cylinder 41. Therefore, even under the condition that the boundary layer easily develops by the inflow of the seal gas, it is possible to suppress the boundary layer from developing along the inner cylinder 41 and the flow of the boundary layer from being separated.

Furthermore, since the gas turbine 100 is provided with the turbine 2A configured as described above, the pressure recovery in the diffuser 4A is capable of being efficiently performed. As a result, performance improvement of the gas turbine 100 is capable of being obtained.

Second Embodiment

Next, a turbine and a gas turbine according to a second embodiment of the present invention will be described on the basis of the drawings. In the description of the second embodiment, the same parts as those in the first embodiment are denoted by the same reference numerals, and repeated descriptions will be omitted.

Figure 4:
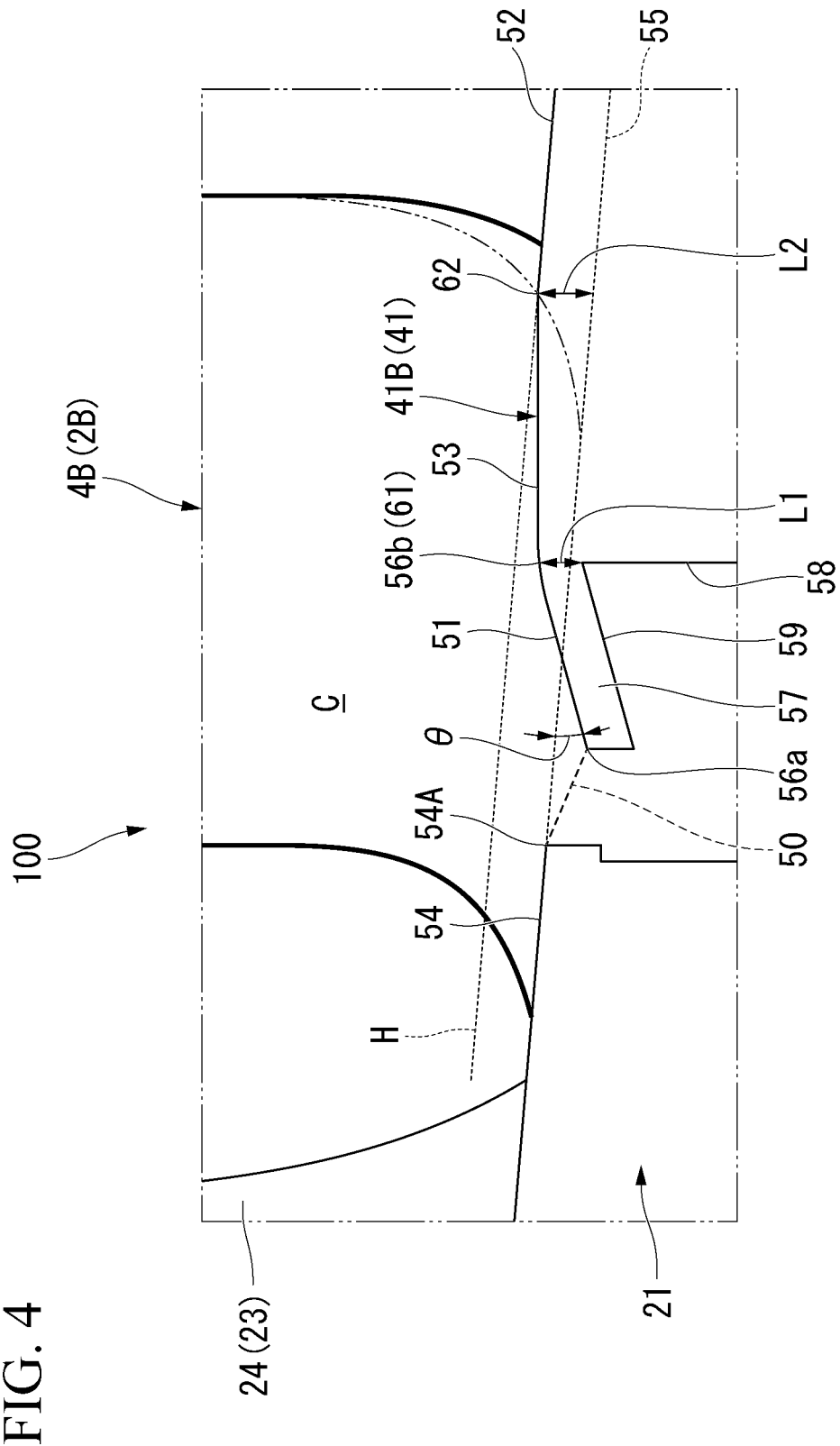
FIG. 4 is an enlarged schematic view of a diffuser inlet according to a second embodiment of the present invention.

As illustrated in FIG. 4, the gas turbine 100 is provided with a seal gas inflow port 50 at an inlet of a diffuser 4B. The seal gas inflow port 50, for example, causes some of compressed air generated by the compressor 1 as a seal gas to flow toward the inner side of the exhaust flow path C from a gap between the above-described inner cylinder 41 of the diffuser 4B and the turbine rotor 21.

An outer circumferential surface 41B of the inner cylinder 41 includes a first inclined surface 51, a second inclined surface 52, and a connection surface 53. The connection surface 53 is not limited to the case of being formed in the shape of a straight line in the cross section illustrated in FIG. 4. The connection surface 53 may be slightly curved within a range in which the separation of the flow does not occur, as compared to the case where the connection surface 53 is formed in the shape of the straight line as described above.

The first apex portion 61 is a part of the first inclined surface 51 that is farthest away from the extension line 55 to the outer side in the radial direction. The first apex portion 61 is disposed on a more outer side in the radial direction than the edge portion 54A on the other side of the platform 54 in the direction of the axis Am.

Similarly, the second apex portion 62 is a part of the second inclined surface 52 that is farthest away from the extension line 55 to the outer side in the radial direction. The second apex portion 62 is also disposed on a more outer side in the radial direction than the edge portion 54A on the other side of the platform 54 in the direction of the axis Am.

The first distance L1 between the first apex portion 61 and the extension line 55 at the same position in the direction of the axis Am is slightly shorter than the second distance L2 which is similarly a distance between the second apex portion 62 and the extension line. Thus, the connection surface 53 has a shape of a plane parallel to the axis Am or a shape similar to the plane parallel to the axis Am.

The first distance L1 is capable of being set to be greater than 0% and equal to or less than 10% with respect to the blade height of the turbine blade 24 forming the turbine blade stage 23 of the lowermost downstream side. Here, the first distance L1 may be greater than 0% and equal to or less than 5%. Furthermore, the first distance L1 may be greater than 0% and equal to or less than 3%.

Similarly to the first distance L1, the second distance L2 is capable of being set to be greater than 0% and equal to or less than 10% with respect to the blade height of the turbine blade 24 forming the turbine blade stage 23 of the lowermost downstream side. Furthermore, the second distance L2 may be greater than 0% and equal to or less than 5%. Furthermore, the second distance L2 may be greater than 0% and equal to or less than 3%.

Here, if the value of the first distance L1 at the first apex portion 61 is too large, in some cases, the angle of the flow guided by the first inclined surface 51 with respect to the main flow of the exhaust gas may become too large. In this way, if the angle of the flow becomes too large, there is a possibility that the flow may be separated at a location where the flow exceeds the first apex portion 61.

However, according to the aforementioned second embodiment, the first distance L1 at the first apex portion 61 is equal to or less than 10%. Therefore, it is possible to suppress the thickness of the boundary layer formed along the outer circumferential surface 41B of the inner cylinder 41 of the diffuser 4B, while suppressing the separation due to the direction of the flow.

In a case where the first distance L1 is set to be equal to or less than 5% with respect to the blade height of the turbine blade 24, it is possible to suppress the separation due to the flowing direction as compared to a case where the first distance L1 is set to be equal to or less than 10%.

In a case where the first distance L1 is set to be equal to or less than 3% with respect to the blade height of the turbine blade 24, it is possible to further suppress the separation due to the flowing direction as compared to a case where the first distance L1 is set to be equal to or less than 5%.

In addition, since the first distance L1 is set to be greater than 0% with respect to the blade height of the turbine blade 24, the total pressure of the main flow of the exhaust gas increases by an amount by which the first apex portion 61 is disposed radially outward from the extension line 55, thereby it is possible to suppress the thickness of the boundary layer formed along the outer circumferential surface 41B of the inner cylinder 41 of the diffuser 4B.

Furthermore, the first apex portion 61 is disposed on a more outer side in the radial direction than the edge portion 54A on the other side of the platform 54 in the direction of the axis Am. Therefore, the thickness of the boundary layer at the position of the first apex portion 61 of the diffuser 4B is capable of being reduced as compared to the thickness of the boundary layer at the outlet of the turbine blade 24. As a result, it is possible to suppress the development of the boundary layer of the diffuser 4B. Further, since the outer circumferential surface 41B of the inner cylinder 41 closer to the other side in the direction of the axis Am than the first inclined surface 51 is disposed on the outer side in the radial direction, the total pressure of the main flow is capable of being increased. Therefore, the development of the boundary layer is capable of being reduced by the amount by which the total pressure of the main flow increases.

Furthermore, the inner cylinder 41 includes a second inclined surface 52 which is disposed to be closer to the other side in the direction of the axis Am than the first inclined surface 51 and is disposed on a more outer side in the radial direction than the extension line 55 to extend from the outer side toward the inner side in the radial direction as going from one side to the other side in the direction of the axis Am. Therefore, the exhaust flow path of the diffuser 4B is capable of expanding to the inner cylinder 41 side, and the performance of the diffuser 4B is capable of being improved.

Further, by setting the second distance L2 to be equal to or less than 10% with respect to the blade height of the turbine blade 24, when the flow exceeds the second apex portion 62, it is possible to suppress the flow from being separated by the inclination of the second inclined surface 52.

Here, the flow at the outlet of the turbine blade 24 has a boundary layer, and by providing a level difference of about 10%, it is possible to cut all or a part thereof. Therefore, the thickness of the boundary layer is capable of being reduced.

In a case where the second distance L2 is set to be equal to or less than 5% with respect to the blade height of the turbine blade 24, it is possible to suppress separation due to the flowing direction as compared to a case where the second distance L2 is set to be equal to or less than 10%, while reducing the thickness of the boundary layer.

In a case where the second distance L2 is set to be equal to or less than 3% with respect to the blade height of the turbine blade 24, separation of the flow is capable of being further suppressed compared to a case where the second distance L2 is set to be equal to or less than 5%.

Further, since the second distance L2 is set to be greater than 0% with respect to the blade height of the turbine blade 24, the total pressure of the main flow of the exhaust gas increases by the amount by which the second apex portion 62 is disposed on the outer side in the radial direction from the extension line 55, thereby it is possible to suppress the thickness of the boundary layer formed along the outer circumferential surface 41B of the inner cylinder 41 of the diffuser 4B.

Further, since the connection surface 53 is formed, it is possible to reduce a difference in angle between the first inclined surface 51 and the connection surface 53, and a difference in angle between the connection surface 53 and the second inclined surface 52. As a result, it is possible to suppress separation of the flow between the first inclined surface 51 and the connection surface 53, and between the connection surface 53 and the second inclined surface 52.

Third Embodiment

Next, a turbine according to a third embodiment of the present invention will be described on the basis of the drawings. The third embodiment is different from the above-described second embodiment only in the distance between the outer circumferential surface 41B of the inner cylinder 41 and the extension line 55. Therefore, the same parts as those of the second embodiment will be described by being denoted by the same reference numerals, and the repeated description will not be provided.

Figure 5:
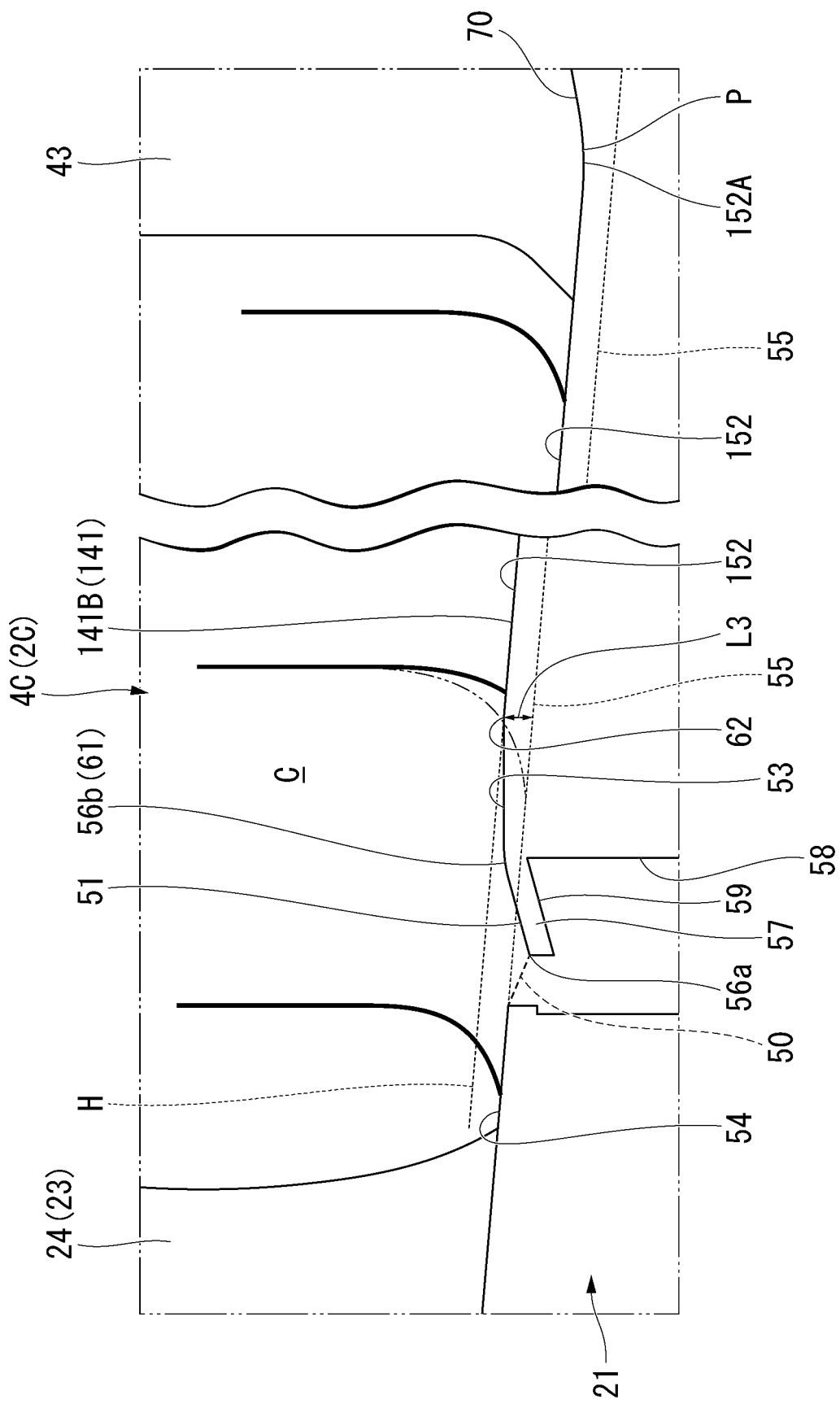
FIG. 5 is a view corresponding to FIG. 4 according to a third embodiment of the present invention.

FIG. 5 is a view corresponding to FIG. 4 in the third embodiment of the present invention.

As illustrated in FIG. 5, a diffuser 4C of a turbine 2C according to the third embodiment includes an inner cylinder 141, an outer cylinder 42 (not illustrated), and a strut 43 (a strut 44 is not illustrated).

Same as in the diffuser 4B of the aforementioned second embodiment, the diffuser 4C forms an exhaust flow path C between the inner cylinder 141 and the outer cylinder 42.

An outer circumferential surface 141B of the inner cylinder 141 includes a first inclined surface 51, a second inclined surface 152, a connection surface 53, and a third inclined surface 70.

Same as in the second embodiment described above, the first inclined surface 51 extends to face from the inner side to the outer side in the radial direction centering on the axis Am as going from the turbine rotor 21 side which is one side in the direction of the axis Am to the outlet side of the diffuser 4C which is the other side. Further, the first inclined surface 51 is disposed to intersect the extension line 55 (illustrated by a broken line in FIG. 5) obtained by extending the platform 54 of the turbine blade 24 of the turbine blade stage 23 disposed on the lowermost downstream side to the other side in the direction of the axis Am, in a cross-sectional view including the axis Am illustrated in FIG. 5. Further, the first inclined surface 51 is formed at closest to one side of the inner cylinder 141 in the direction of the axis Am.

Same as in the second inclined surface 52 of the aforementioned second embodiment, the second inclined surface 152 is disposed to be closer to the other side in the direction of the axis Am than the first inclined surface 51. The second inclined surface 152 is disposed on a more outer side in the radial direction than the extension line 55. An edge portion 152A of the second inclined surface 152 on the other side in the direction of the axis Am is disposed at a position which overlaps the strut 43 in the direction of the axis Am.

The connection surface 53 connects the first inclined surface 51 and the second inclined surface 152 same as in the second embodiment. That is, the connection surface 53 connects the first apex portion 61 of the first inclined surface 51 disposed to be closest to the other side in the direction of the axis Am and the second apex portion 62 of the second inclined surface 152 disposed to be closest to one side in the direction of the axis Am.

The third inclined surface 70 extends from the edge portion 152A of the second inclined surface 152 on the other side in the direction of the axis Am toward the outlet of the diffuser 4C. The third inclined surface 70 is formed to be inclined in an opposite direction to the inclination of the second inclined surface 152 with respect to the extension line 55. The third inclined surface 70 illustrated in the third embodiment is inclined to be gradually separated from the extension line 55 as going from one side to the other side in the direction of the axis Am. Furthermore, in other words, the inner cylinder 41 includes a change point P at which the inclination angle with respect to the axis Am changes within the range in which the strut 43 is disposed in the direction of the axis Am. Here, the term "inclination angle with respect to the axis Am" can also be referred to as the inclination angle of the inner cylinder 41 based on the axis Am in a cross section including the axis Am (for example, a cross section illustrated in FIG. 5). The expression "inclination angle changes" means that the inclination angle changes by a preset threshold or more.

For example, in the case where the second inclined surface 152 and the third inclined surface 70 include a convex curved surface or a concave curved surface in a cross-sectional view including the axis Am, the change point P is a location in which the inclination of the tangent of the third inclined surface 70 changes from a positive side to a negative side (in FIG. 5, from a right shoulder top to a right shoulder bottom) or from a negative side to a positive side (for example, from the right shoulder bottom to the right shoulder top), with respect to the inclination of the tangent of the second inclined surface 152. Furthermore, in other words, the change point P means a location formed like a valley fold or a mountain fold. That is, although the third embodiment illustrates a case where the inner cylinder 41 is shifted from the diameter decrease to the diameter increase, from one side to the other side in the direction of the axis Am across the change point P, the embodiment is not limited thereto.

The inclination angles or the inclination directions of the first inclined surface 51, the second inclined surface 152, and the connection surface 53 with respect to the extension line 55 are different from each other. Therefore, the distance between the extension line 55 at the same position in the direction of the axis Am and the outer circumferential surface 141B of the inner cylinder 141 changes, depending on the shapes of the first inclined surface 51, the second inclined surface 152, and the connection surface 53.

Among the distances to the outer circumferential surface 141B of the inner cylinder 141, when a distance which becomes the largest value in the range from the inlet of the inner cylinder 141 in the direction of the axis Am to the change point P is assumed to be a third distance L3, the third distance L3 is set to be equal to or less than 10% with respect to the blade height of the turbine blade 24 of the turbine blade stage 23 disposed on the lowermost downstream side (in other words, the other side in the direction of the axis Am). The third distance L3 illustrated in FIG. 5 of the third embodiment is the distance (the second distance L2 of the second embodiment) between the extension line 55 and the location of the second inclined surface 152 closest to one side in the direction of the axis Am. However, the position of the third distance L3 changes, depending on the shapes of the first inclined surface 51, the second inclined surface 152, and the connection surface 53.

The third distance L3 may be greater than 0% and equal to or less than 5% with respect to the blade height of the turbine blade 24 forming the turbine blade stage 23 of the lowermost downstream side. Furthermore, the third distance L3 may be greater than 0% and equal to or less than 3%.

In the exhaust flow path C, the flow path cross-sectional area is expanded and the boundary layer is easily developed on the downstream side of the strut 43.

Therefore, in the third embodiment, the third distance L3 is set to be equal to or less than 10% with respect to the blade height of the turbine blade 24. With such a configuration, it is possible to suppress an occurrence of separation due to the flowing direction. Therefore, it is also possible to suppress the development of the boundary layer, while suppressing the occurrence of separation in the flow from the turbine blade 24 to the position of the strut 43. As a result, the performance of the diffuser 4C is capable of being improved.

In contrast, if the third distance L3 is set to be greater than 10% with respect to the blade height of the turbine blade 24, the flowing direction is directed to the outer side in the radial direction too much. As a result, an occurrence of separation due to the flowing direction may be promoted, and there is a possibility that the flow may be separated on the downstream side of the strut 43.

In the case where the third distance L3 is set to be equal to or less than 5% with respect to the blade height of the turbine blade 24, it is possible to further suppress separation due to the flowing direction, while reducing the thickness of the boundary layer, compared to the case where the third distance L3 is set to be equal to or less than 10%.

When the third distance L3 is set to be equal to or less than 3% with respect to the blade height of the turbine blade 24, it is possible to further suppress separation due to the flowing direction, compared to the case where the third distance L3 is set to be equal to or less than 5%.

Further, since the third distance L3 is set to be greater than 0% with respect to the blade height of the turbine blade 24, the total pressure of the main flow of the exhaust gas increases by the amount by which the outer circumferential surface 141B of the inner cylinder 141 is disposed on the outer side in the radial direction from the extension line 55, thereby it is possible to suppress the thickness of the boundary layer formed along the outer circumferential surface 141B.

As a result, even if the flow path cross-sectional area of the exhaust flow path C is expanded to be closer to the other side in the direction of the axis Am than the strut 43, it is possible to suppress the development of the boundary layer as the flow separates.

Fourth Embodiment

Next, a turbine according to a fourth embodiment of the present invention will be described on the basis of the drawings. The fourth embodiment is different from the aforementioned third embodiment in that the change point P is not provided at a position at which the strut 43 is formed in the direction of the axis Am. Therefore, the same parts as the third embodiment will be described by being denoted by the same reference numerals, and the repeated description will not be provided.

FIG. 6 is a view corresponding to FIG. 4 in the fourth embodiment of the present invention.

As illustrated in FIG. 6, a diffuser 4D of a turbine 2D according to the fourth embodiment includes an inner cylinder 241, an outer cylinder 42 (not illustrated), and a strut 43 (a strut 44 is not illustrated).

Same as in the diffuser 4A of the aforementioned first embodiment, the diffuser 4D forms an exhaust flow path C between the inner cylinder 241 and the outer cylinder 42.

An outer circumferential surface 241B of the inner cylinder 241 includes a first inclined surface 51, a second inclined surface 252, and a connection surface 53.

Same as in the first embodiment described above, the first inclined surface 51 extends to face from the inner side to the outer side in the radial direction centering on the axis Am as going from the turbine rotor 21 side which is one side in the direction of the axis Am toward the outlet side of the diffuser 4D which is the other side. Further, the first inclined surface 51 is disposed to intersect the extension line 55 (illustrated by a broken line in FIG. 6) obtained by extending the platform 54 of the turbine blade 24 of the turbine blade stage 23 disposed on the lowermost downstream side to the other side in the direction of the axis Am, in a cross-sectional view including the axis Am illustrated in FIG. 6. Further, the first inclined surface 51 is formed on the inner cylinder 241 to be closest to one side in the direction of the axis Am.

Same as in the second inclined surface 52 of the aforementioned first embodiment, the second inclined surface 252 is disposed to be closer to the other side in the direction of the axis Am than the first inclined surface 51. The second inclined surface 252 is disposed on a more outer side in the radial direction than the extension line 55.

The connection surface 53 connects the first inclined surface 51 and the second inclined surface 252, same as in the first embodiment. That is, the connection surface 53 connects the first apex portion 61 disposed to be closest to the other side of the first inclined surface 51 on the other side in the direction of the axis Am and the second apex portion 62 of the second inclined surface 252 disposed to be closest to one side in the direction of the axis Am.

In the inner cylinder 241 of the fourth embodiment, the change point P (see FIG. 5) described in the third embodiment is not formed within the range in which the struts 43 is disposed in the direction of the axis Am.

The fourth embodiment illustrates an example case where the second inclined surface 252 extends from one side in the direction of the axis Am of the strut 43 to the other side in the direction of the axis Am of the strut 43 in the shape of the straight line so that the diameter of the inner cylinder 241 is reduced at a constant rate in a cross-sectional view including the axis Am.

Here, the inclination angles or the directions of the inclinations of the first inclined surface 51, the second inclined surface 252, and the connection surface 53 with respect to the extension line 55 are different from each other. Therefore, the distance between the extension line 55 at the same position in the direction of the axis Am and the outer circumferential surface 241B of the inner cylinder 241 changes, depending on the shapes of the first inclined surface 51, the second inclined surface 252, and the connection surface 53.

Among the distances between the outer circumferential surface 241B of the inner cylinder 241 and the extension line 55, when the distance having the largest value in the range from the inlet of the inner cylinder 241 in the direction of the axis Am to the central position Pc in the direction of the axis Am of the strut 43 is assumed to be a fourth distance L4, the fourth distance L4 is set to be equal to or less than 10% with respect to the blade height of the turbine blade 24 of the turbine blade stage 23 disposed on the lowermost downstream side. Further, although the fourth distance L4 illustrated in FIG. 6 of the fourth embodiment is the distance (the second distance L2 in the first embodiment) between the extension line 55 and the location closest to one side of the second inclined surface 252 in the direction of the axis Am, the position of the fourth distance L4 changes, depending on the shapes of the first inclined surface 51, the second inclined surface 252, and the connection surface 53.

The aforementioned fourth distance L4 may be greater than 0% and equal to or less than 5% with respect to the blade height of the turbine blade 24 forming the turbine blade stage 23 of the lowermost downstream side. Furthermore, the fourth distance L4 may be greater than 0% and equal to or less than 3%.

In the aforementioned fourth embodiment, by setting the fourth distance L4 to be equal to or less than 10% with respect to the blade height of the turbine blade 24, it is possible to suppress the occurrence of separation due to the flowing direction. Therefore, even if the boundary layer develops at the outlet of the strut 43, it is possible to suppress separation of the flow, and the performance of the diffuser 4D is capable of being improved. In contrast, if the fourth distance L4 is set to be greater than 10% with respect to the blade height of the turbine blade 24, the flowing direction is directed to the outer side in the radial direction too much, and the occurrence of separation due to the flowing direction is promoted. Therefore, there is a possibility that the flow is separated at the downstream side of the strut 43.

Further, in the case where the fourth distance L4 is set to be equal to or less than 5% with respect to the blade height of the turbine blade 24, it is possible to further suppress the separation of flow as compared to the case where the fourth distance L4 is set to be equal to or less than 10%.

Furthermore, in the case where the fourth distance L4 is set to be equal to or less than 3% with respect to the blade height of the turbine blade 24, it is possible to further suppress separation due to the flowing direction as compared to the case where the fourth distance L4 is set to be equal to or less than 5%.

In addition, since the fourth distance L4 is set to be greater than 0% with respect to the blade height of the turbine blade 24, the total pressure of the main flow of the exhaust gas increases by the amount by which the outer circumferential surface 241B of the inner cylinder 241 is disposed on the outer side in the radial direction from the extension line 55, thereby it is possible to suppress the thickness of the boundary layer formed along the outer circumferential surface 241B.

The present invention is not limited to the configuration of the embodiment described above, and design changes is capable of being made without departing from the scope of the invention.

For example, the inclination angle or the inclination direction with respect to the extension line 55 of the connection surface 53 or the second inclined surfaces 52, 152, and 252 mentioned above is an example, and is not restricted to this configuration. Also, the connection surface 53 may be provided as necessary, and may be omitted.

INDUSTRIAL APPLICABILITY

The present invention is applicable to a turbine and a gas turbine. According to the present invention, the exhaust performance of the diffuser is capable of being improved to improve the efficiency of the entire gas turbine.

REFERENCE SIGNS LIST

1 Compressor
2A, 2B, 2C, 2D Turbine
3 Combustor
4A, 4B, 4C, 4D Diffuser
11 Compressor rotor
12 Compressor casing
13 Compressor blade stage
14 Compressor blade
15 Compressor vane stage
16 Compressor vane
21 Turbine rotor
22 Turbine casing
23 Turbine blade stage
24 Turbine blade
25 Turbine vane stage
26 Turbine vane
30 Bearing device
41, 141, 241 Inner cylinder
41A, 41B, 141B, 241B Outer circumferential surface
42 Outer cylinder
43 Strut
44 Strut 50 Seal gas inflow port
51 First inclined surface
52, 152, 252 Second inclined surface
53 Connection surface
54 Platform
55 Extension line
56a Leading edge portion
56b Trailing edge portion
57 Beam portion
58 Inner wall
59 Lower surface
61 First apex portion
62 Second apex portion
91 Gas turbine rotor
91A Shaft end portion
92 Gas turbine casing
100 Gas turbine
152A Edge portion
Am Axis
C Exhaust flow path
G Generator
P Change point

The invention claimed is:

1. A turbine, comprising:
a turbine rotor extending along an axis and rotatable about the axis;
a turbine casing covering the turbine rotor from an outer circumferential side;
a plurality of turbine blades arranged on an outer circumferential surface of the turbine rotor in a circumferential direction of the axis;
a plurality of turbine vanes provided on an inner circumferential surface of the turbine casing to be adjacent to one side in a direction of the axis with respect to the turbine blade, and arranged in the circumferential direction; and
a diffuser provided on the other side in the direction of the axis of the turbine blade, and forming an exhaust flow path through which exhaust gas flows from one side to the other side in the direction of the axis;
wherein the diffuser includes
an inner cylinder extending along the axis, and
an outer cylinder covering the inner cylinder from the outer circumferential side, and forming the exhaust flow path between the outer cylinder and the inner cylinder,
the inner cylinder includes a first inclined surface extending from an inner side to an outer side in a radial direction centering on the axis as going from the one side to the other side in the direction of the axis, and a second inclined surface disposed at closer to the other side in the direction of the axis than the first inclined surface and extends from the outer side to the inner side in the radial direction as going from one side to the other in the direction of the axis, and
the first inclined surface is disposed to intersect an extension line obtained by extending platforms of the plurality of turbine blades to the other side in the direction of the axis in a cross-sectional view including the axis.

2. The turbine according to claim 1, wherein the inner cylinder includes the first inclined surface where is closest to the one side in the direction of the axis.

3. The turbine according to claim 1, further comprising:
a seal gas inflow port for causing a seal gas to flow into the exhaust flow path, between the inner cylinder and the platform.

4. The turbine according to claim 1, wherein in the inner cylinder, an outer circumferential surface closer to the other side in the direction of the axis than the first inclined surface is disposed on the outer side of the extension line in the radial direction.

5. The turbine according to claim 1, wherein a first distance, which is a distance between the extension line and a first apex portion of the first inclined surface located to be closest to the outer side in the radial direction at the same position in the direction of the axis, is set to be equal to or less than 10% with respect to a blade height of the turbine blade.

6. The turbine according to claim 5, wherein the first distance is set to be equal to or less than 5% with respect to the blade height.

7. The turbine according to claim 5, wherein the first distance is set to be equal to or less than 3% with respect to the blade height.

8. The turbine according to claim 5, wherein the first distance is greater than 0% with respect to the blade height.

9. The turbine according to claim 5, wherein the first apex portion is disposed on the outer side in the radial direction of an edge portion on the other side of the platform in the direction of the axis.

10. The turbine according to claim 5,
wherein the second inclined surface disposed on the outer side of the extension line in the radial direction, and
a second distance, which is a distance between the extension line and a second apex portion of the second inclined surface disposed to be closest to the outer side in the radial direction at the same position in the direction of the axis, is set to be equal to or less than 10% with respect to the blade height of the turbine blade.

11. The turbine according to claim 10, wherein the second distance is set to be equal to or less than 5% with respect to the blade height.

12. The turbine according to claim 10, wherein the second distance is set to be equal to or less than 3% with respect to the blade height.

13. The turbine according to claim 10, wherein the second distance is greater than 0% with respect to the blade height.

14. The turbine according to claim 10, further comprising:
a connection surface connecting the first apex portion and the second apex portion, wherein the second distance is longer than the first distance.

15. The turbine according to claim 5,
wherein the diffuser includes a strut connecting the inner cylinder and the outer cylinder,
the inner cylinder includes a change point at which an inclination angle with respect to the axis changes within a range in which the strut is disposed in the direction of the axis, and
a third distance, which is a distance between the extension line and an outer circumferential surface of the inner cylinder disposed on the outer side of the extension line in the radial direction in the range from an inlet of the inner cylinder to the change point in the direction of the axis at the same position in the direction of the axis, is set to be equal to or less than 10% with respect to the blade height of a blade of the turbine.

16. The turbine according to claim 15, wherein the third distance is set to be equal to or less than 5% with respect to the blade height.

17. The turbine according to claim 15, wherein the third distance is set to be equal to or less than 3% with respect to the blade height.

18. The turbine according to claim 15, wherein the third distance is greater than 0% with respect to the blade height.

19. The turbine according to claim 5,
wherein the diffuser includes a strut connecting the inner cylinder and the outer cylinder,
a change point at which an inclination angle with respect to the axis changes within the range in which the strut is disposed in the direction of the axis is not formed in the inner cylinder, and
a fourth distance, which is a distance between the extension line and an outer circumferential surface of the inner cylinder, in the range from the inlet of the inner cylinder to a central position of the strut in the direction of the axis at the same position in the direction of the axis, is set to be equal to or less than 10% with respect to the blade height of a blade of the turbine.

20. The turbine according to claim 19, wherein the fourth distance is set to be equal to or less than 5% with respect to the blade height.

21. The turbine according to claim 19, wherein the fourth distance is set to be equal to or less than 3% with respect to the blade height.

22. The turbine according to claim 19, wherein the fourth distance is set to be greater than 0% with respect to the blade height.

23. A gas turbine, comprising:
a compressor generating compressed air obtained by compressing air;
a combustor mixing fuel with the compressed air to generate a combustion gas; and
the turbine according to claim 1 driven by the combustion gas.

* * * * *